US007415345B2

(12) United States Patent
Wild

(10) Patent No.: US 7,415,345 B2
(45) Date of Patent: Aug. 19, 2008

(54) METHOD FOR OPERATING AN INTERNAL COMBUSTION ENGINE

(75) Inventor: Ernst Wild, Oberriexingen (DE)

(73) Assignee: Robert Bosch GmbH, Stuttgart (DE)

( * ) Notice: Subject to any disclaimer, the term of this patent is extended or adjusted under 35 U.S.C. 154(b) by 69 days.

(21) Appl. No.: 10/590,856

(22) PCT Filed: Nov. 21, 2005

(86) PCT No.: PCT/EP2005/056092

§ 371 (c)(1),
(2), (4) Date: Aug. 25, 2006

(87) PCT Pub. No.: WO2006/069853

PCT Pub. Date: Jul. 6, 2006

(65) Prior Publication Data

US 2007/0168105 A1 Jul. 19, 2007

(30) Foreign Application Priority Data

Dec. 23, 2004 (DE) ....................... 10 2004 062 018

(51) Int. Cl.
*G06F 17/00* (2006.01)
*G01M 19/00* (2006.01)
*F02D 11/10* (2006.01)

(52) U.S. Cl. ....................... 701/103; 123/399; 73/118.2

(58) Field of Classification Search ......... 701/101–106, 701/110–115; 73/116, 117.3, 118.1, 118.2; 702/183; 123/361, 399, 445, 478, 480, 350
See application file for complete search history.

(56) References Cited

U.S. PATENT DOCUMENTS

| | | | | |
|---|---|---|---|---|
| 3,969,614 | A * | 7/1976 | Moyer et al. | 701/103 |
| 4,999,781 | A | 3/1991 | Holl et al. | |
| 5,889,205 | A * | 3/1999 | Treinies et al. | 73/118.2 |
| 6,246,950 | B1 * | 6/2001 | Bessler et al. | 701/99 |
| 6,366,847 | B1 | 4/2002 | Sun et al. | |
| 6,810,855 | B2 * | 11/2004 | Hasegawa et al. | 123/445 |

FOREIGN PATENT DOCUMENTS

| | | |
|---|---|---|
| DE | 44 22 184 | 1/1996 |
| DE | 197 56 919 | 10/1998 |
| DE | 198 44 637 | 10/1999 |
| EP | 1 247 967 | 10/2002 |

* cited by examiner

*Primary Examiner*—Willis R Wolfe, Jr.
(74) *Attorney, Agent, or Firm*—Michael J. Striker

(57) ABSTRACT

In operation of an internal combustion engine, an air filling (rl) in a combustion chamber is ascertained, taking into account a pressure (ps) in an intake conduit. It is proposed that the air filling (rl) be ascertained on the basis of a model (A), which as its input variables receives an rpm (nmot) of a crankshaft and a ratio of the pressure (ps) in the intake conduit (22) to an ambient pressure (pu).

11 Claims, 6 Drawing Sheets

METHOD FOR OPERATING AN INTERNAL COMBUSTION ENGINE

BACKGROUND OF THE INVENTION

The invention relates to a method for operating an internal combustion engine, in which an air filling in a combustion chamber is ascertained taking into account a pressure in an intake conduit. The invention also relates to a computer program, an electrical memory for a control and/or regulating device of an internal combustion engine, and to control and/or regulating device of an internal combustion engine.

A method of the type defined at the outset is known on the market. In many internal combustion engines, the pressure in an intake conduit is measured by means of a pressure sensor. Via a linear relationship, an air filling in the combustion chambers of the engine is calculated from the measured pressure. Above all in air-guided systems, knowledge of this air filling is important for correct metering of the fuel into the combustion chambers of the engine. Correct metering of the fuel in turn has effects on engine fuel consumption and emissions. Reference in this connection is made in general to German Patent Disclosure DE 197 56 919 A1.

Four-stroke internal combustion engines with camshaft overlap are also known. In such engines, in the region of top dead center between the expulsion stroke and the intake stroke, the outlet and inlet valves of a combustion chamber can be open simultaneously for a certain crankshaft range. As a result, an internal exhaust gas recirculation can be implemented, as a result of which among other effects a reduction in nitrogen oxide emissions can be achieved. However, it has been found that in such systems, if the camshaft overlap is great, the ascertainment of the air filling in the combustion chamber has so far been either complex or imprecise.

The present invention therefore has the object of refining a method of the type defined at the outset in such a way that even in systems with major camshaft overlap, the most precise possible determination of the air filling is possible on the basis of the pressure prevailing in the intake conduit.

In a method of the type defined at the outset, this object is attained in that the air filling is ascertained on the basis of a model, which as its input variables receives an rpm of a crankshaft and a ratio of the pressure in the intake conduit to an ambient pressure. In a computer program, an electrical memory, and a control and/or regulating device of an internal combustion engine, the stated object is attained accordingly.

SUMMARY OF THE INVENTION

According to the invention, it has been recognized that in systems with major camshaft overlap, there is a nonlinear relationship between the air filling in a combustion chamber and the air pressure in the intake conduit. It has also been recognized that this nonlinear relationship is essentially a function of the ratio between the air pressure prevailing in the intake conduit and the ambient pressure. In the method of the invention, this ratio is therefore additionally used to ascertain the air filling present in the combustion chamber. This air filling can therefore be determined with high precision even in systems with major camshaft overlap, which in turn, above all when the engine operates in air-guided fashion, permits a precise setting of a desired fuel-air mixture in the combustion chamber. Finally, by the provisions of the invention, both engine fuel consumption and engine emissions are improved.

An advantageous refinement of the method of the invention is distinguished in that the model additionally receives as its input variable a temperature of the air present in the combustion chamber. As a result, mistakes based on an altered air density air averted or at least reduced, and the precision in ascertaining the air filling is improved still further.

In a refinement of this, it can be assumed that the temperature of the air present in the combustion chamber is equal to the detected temperature of the air in the intake conduit. This reduces the computation effort, without markedly worsening the precision in ascertaining the air filling.

Alternatively to this, the temperature of the air present in the combustion chamber can be ascertained on the basis of a model, which as its input variables receives a detected temperature of the air in the intake conduit and at least one further detected temperature of the engine, in particular a coolant temperature, an exhaust-gas temperature, and/or a cylinder head temperature. This variant method increases the precision without requiring additional sensors.

It is also possible for the ambient pressure to be ascertained from the difference between a detected pressure and a modeled pressure in the intake conduit. In this way, a separate sensor for detecting the ambient pressure can be eliminated, which reduces costs.

The precision with which the ambient pressure is ascertained is increased by providing that the ascertainment is performed only if the throttle valve opening or an equivalent variable reaches and/or exceeds a limit value. This is based on the recognition that the ambient pressure changes only very slowly, and continuous ascertainment is therefore not necessary. If the throttle valve is opened comparatively widely or completely, however, then the ambient pressure can be ascertained with comparatively high precision by an integration via the aforementioned difference.

In a refinement of this, the modeled pressure in the intake conduit can be ascertained from a model which as its input variable receives a difference between an air flow rate into the intake conduit and an air flow rate out of the intake conduit into the combustion chamber. By means of this simple quantitative balance, the pressure in the intake conduit can be modeled very simply and likewise with high precision, so that a corresponding pressure sensor can optionally be dispensed with.

In turn, the air flow rate out of the intake conduit into the combustion chamber can be ascertained on the basis of a model which as its input variable receives a position of a throttle valve. The position of the throttle valve is already detected in typically regulated throttle valves, so that this provision involves no additional cost.

1. In order to be able to take production variations and/or wear effects of the throttle valve into account in ascertaining the air flow rate into the combustion chamber, it is advantageous if the applicable model additionally receives a correction variable of a throttle valve characteristic curve, which is ascertained from the difference between the modeled and the detected pressure in the intake conduit. Once again, this serves to enhance the precision in determining the air flow rate that reaches the combustion chamber. The correction variable is advantageously ascertained only if the throttle valve opening or an equivalent variable is less than a limit value and/or reaches this limit value.

With especially little memory space, minimal sensor expense and little computation time, the above-mentioned methods can be implemented whenever at least one of the models includes a characteristic curve and/or a performance graph.

BRIEF DESCRIPTION OF THE DRAWINGS

An especially preferred exemplary embodiment of the present invention will be described in further detail below in conjunction with the accompanying drawings. Shown in the drawings are.

DETAILED DESCRIPTION OF THE EXEMPLARY EMBODIMENTS

Figure 1:
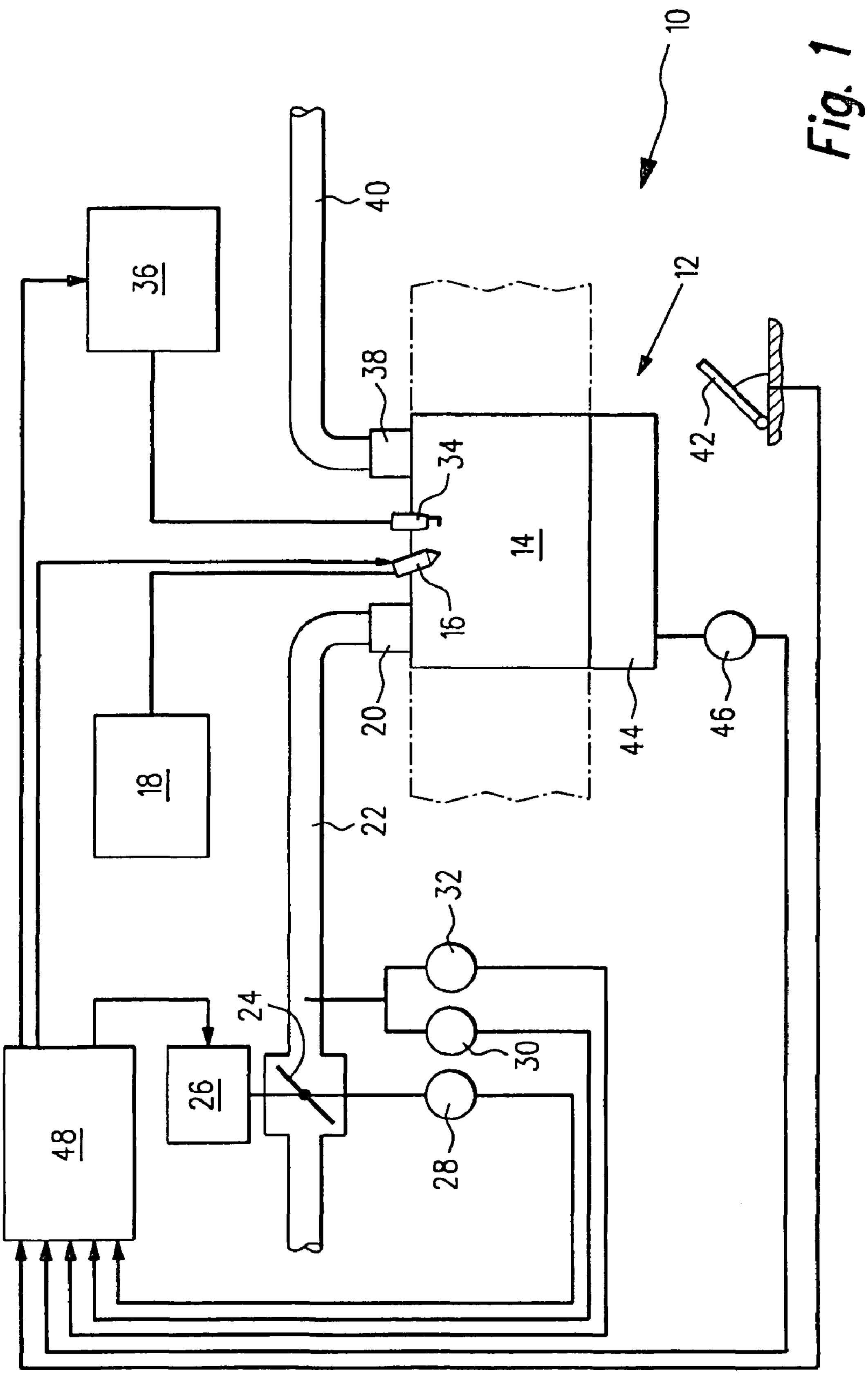
FIG. 1, a schematic illustration of an internal combustion engine.

An internal combustion engine is identified overall in FIG. 1 by reference numeral 10. It includes a plurality of cylinders, of which for the sake of simplicity only one is shown in FIG. 1, at reference numeral 12. The corresponding combustion chamber is assigned reference numeral 14. Fuel is injected into the combustion chamber 14 directly by means of a fuel injector 16, which is connected to a fuel system 18. Air reaches the combustion chamber 14 via an inlet valve 20 and an intake conduit 22, in which conduit a throttle valve 24 is located. The throttle valve is adjusted by a control motor 26; its current position is detected by a throttle valve sensor 28. The air pressure prevailing in the intake conduit 22 is detected by a pressure sensor 30, and the corresponding temperature is detected by a temperature sensor 32 that is combined with the pressure sensor. The pressure sensor 30 is seated downstream of the throttle valve 24 and measures the pressure upstream of the inlet valve 20. As will be described in further detail hereinafter, whenever the inlet valve 20 closes, a pressure equilibrium prevails between the intake conduit 22 and the combustion chamber 14. The air filling in the combustion chamber 14 can therefore be ascertained in this case using the pressure in the intake conduit 22.

A fuel-air mixture present in the combustion chamber 14 is ignited by a spark plug 34, which is connected to an ignition system 36. Hot combustion gases are conducted out of the combustion chamber 14 via an outlet valve 38 and an exhaust tube 40.

The engine 10 shown in FIG. 1 is installed in a motor vehicle, not shown. A power demand on the part of the driver of the motor vehicle is expressed by means of the position of the accelerator pedal 42. The rpm of a crankshaft 44 of the engine 10 is picked up by an rpm sensor 46. The operation of the engine 10 is controlled and regulated, as applicable, by a control and regulating device 48. This device receives input signals from the sensors 28, 30, 32, 42 and 46 and controls the control device 26, the injector 16, and the ignition system 36, among other things.

The engine 10 shown in FIG. 1 is operated on the 4-stroke principle. A valve overlap of the inlet valve 20 and the outlet valve 38 is possible. This means that in the range of top dead center between an expulsion stroke and an intake stroke, both valves 20 and 38 can simultaneously be opened. An internal exhaust gas recirculation can be implemented as a result. For the operation of the engine 10, it is important to be able to ascertain as exactly as possible what the air filling is in the combustion chamber 14. To that end, in a memory of the control and regulating device 48, a computer program is stored which serves to control the method that will now be described in detail with reference to FIGS. 2-6.

Figure 2:
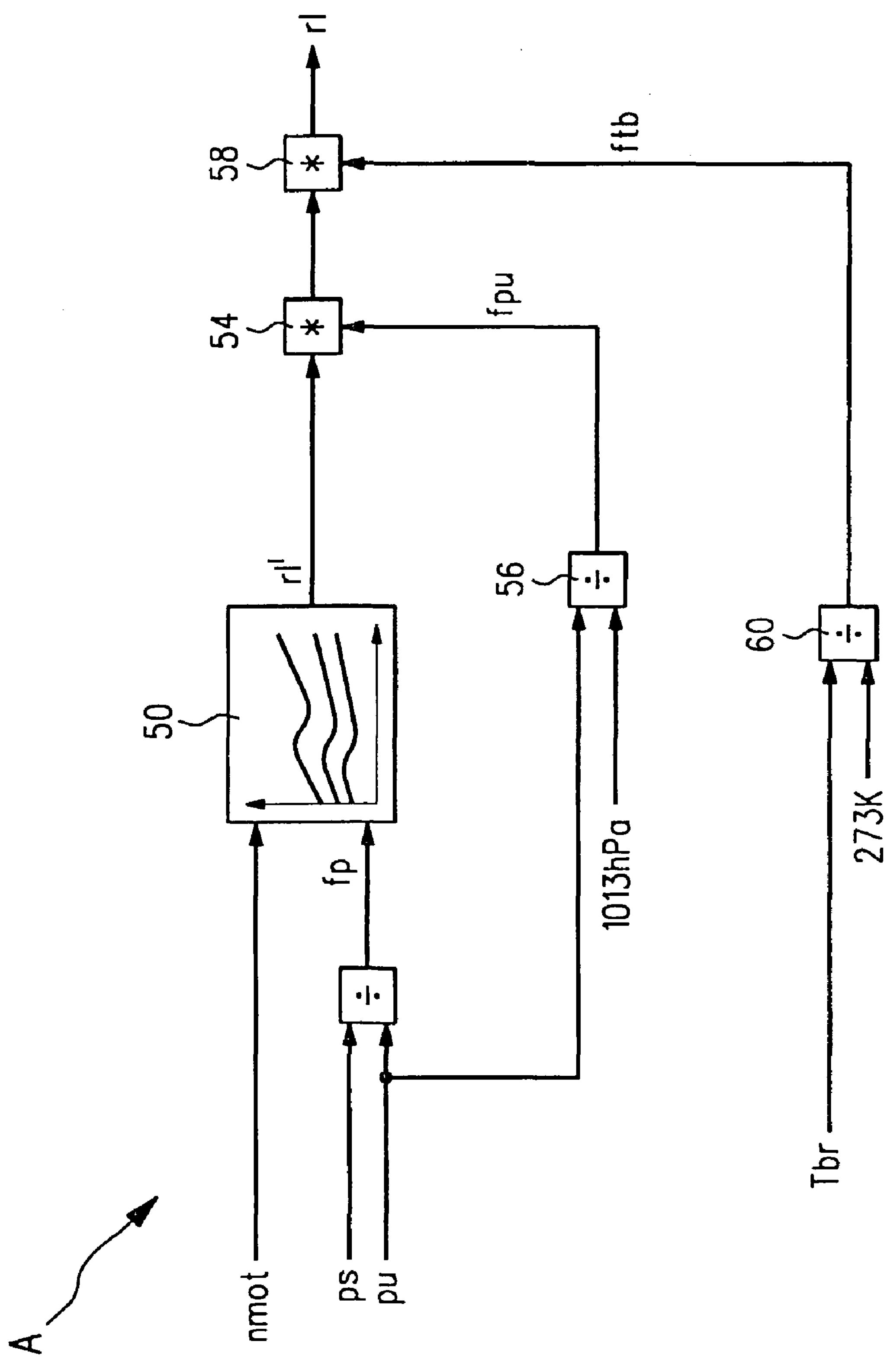
FIG. 2, a flow chart of a method for ascertaining an air filling.

In FIG. 2, it is shown how the air filling present in the combustion chamber 14 of the engine 10 is obtained by means of a partial method A: In it, the rpm nmot furnished by the rpm sensor 46 and a pressure ratio fp are stored in a performance graph 50. The pressure ratio fp is obtained in block 52 by dividing the pressure ps in the intake conduit 22, furnished by the pressure sensor 30, by an ambient pressure pu. The furnishing of the ambient pressure pu will be described in detail hereinafter. The performance graph 50 furnishes a value rl'. In the context of a density correction, this value is multiplied in 54 by a factor fpu, which is obtained by division in block 56 of the ambient pressure pu by the rated pressure of 1.013 hPa.

Analogously, in 58 a multiplication is done by a factor ftb, which is obtained in 60 by dividing a temperature Tbr by the standard temperature of 273K. The temperature Tbr is the gas temperature in the combustion chamber 14 at an instant at which the inlet valve 20 closes. In the simplest case, the temperature Tbr is simply made equivalent to the temperature detected by the temperature sensor 32. Alternatively, however, the temperature Tbr can be obtained by taking into account a further detected temperature, such as a coolant temperature, an exhaust-gas temperature, and/or a cylinder head temperature.

Figure 3:
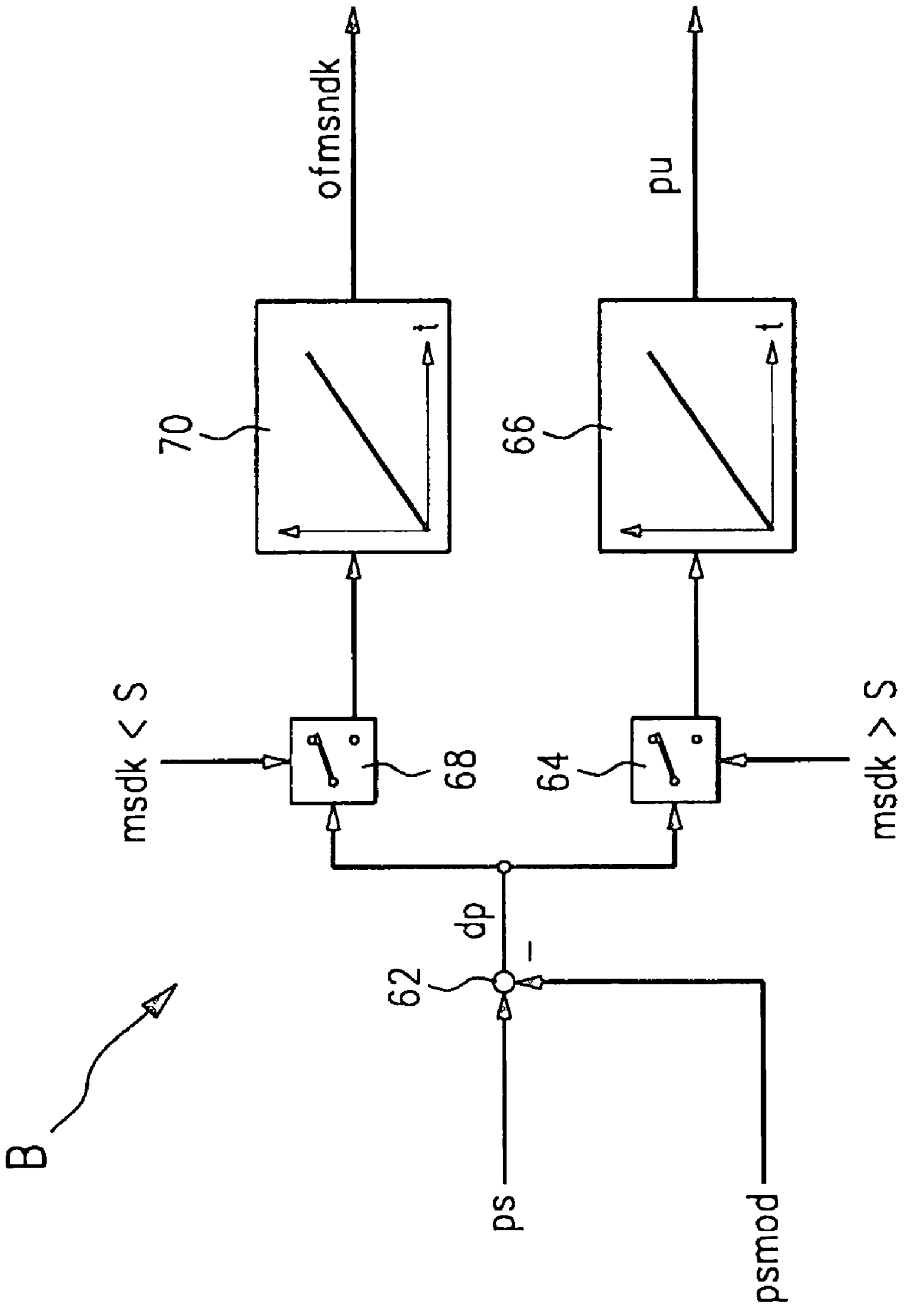
FIG. 3, a flow chart of a method for ascertaining an ambient pressure and for ascertaining an offset of a throttle valve characteristic curve.

The ambient pressure pu used as an input variable in FIG. 2 is in the present case not measured but rather modeled (see FIG. 3, method B). It can be seen from there that in 62, first the difference between the pressure ps in the intake conduit 22 detected by the pressure sensor 30 and a modeled pressure psmod is formed. The furnishing of the modeled pressure psmod will be described in detail hereinafter. The resultant pressure difference dp in 62 can be supplied via a first threshold value switch 64 to a first integrator 66, by which the ambient pressure pu is learned. The pressure difference dp can be supplied via a second threshold value switch 68 to a second integrator 70, by which an offset ofmsndk can be learned. The positions of the two threshold value switches 64 and 68 depend on an air flow rate msdk that flows away via the throttle valve 24 and that in turn depends on the position of the throttle valve 24. If the value msdk is less than or equal to a limit or a threshold value S, then the pressure difference dp is delivered to the second integrator 70; conversely, if the value msdk is greater than the threshold value S, the pressure difference dp is supplied to the first integrator 66.

Figure 4:
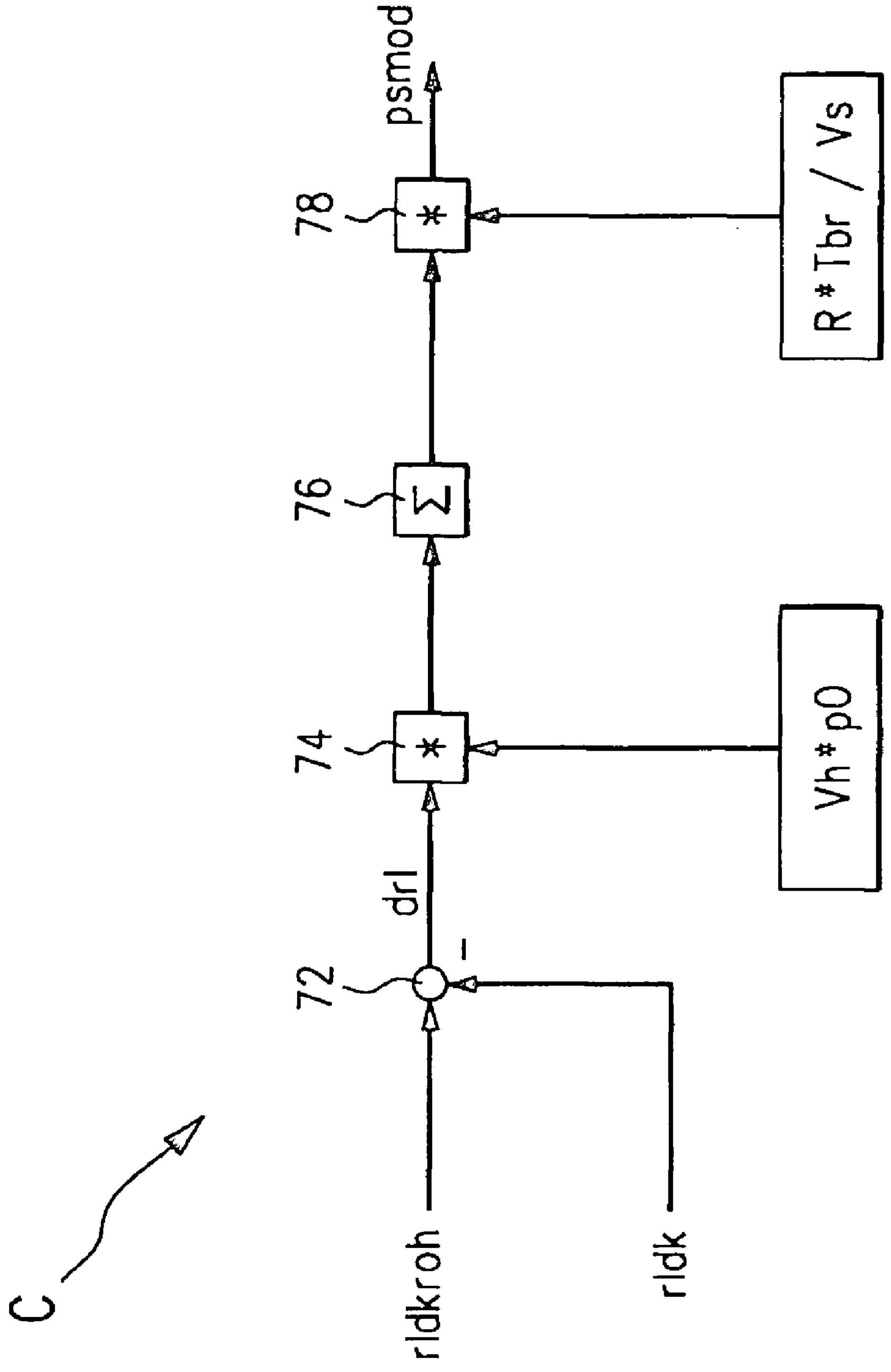
FIG. 4, a flow chart of a method for ascertaining a modeled pressure in an intake conduit of the internal combustion engine of FIG. 1.

In FIG. 4, it is shown how the modeled pressure psmod in the intake conduit 22, required for the pressure difference dp in FIG. 3, is obtained (method C): In 72, the difference between an air flow rate rlkdroh into the intake conduit 22 and an air flow rate rldk out of the intake conduit 22 into the combustion chamber 14 is formed. The determination of the air flow rate rlkdroh will be described in detail hereinafter. The value rldk is obtained by the method already described above in conjunction with FIG. 2; there, the divisor 52, instead of the detected pressure ps, is addressed with the pressure psmod modeled in a previous step. The difference drl obtained in 72 is multiplied in 74 by a stroke volume Vh of the cylinder 12 and a rated density p0. As a result, from the relative value drl, an absolute flow rate is obtained, which is added up in 76. The result is multiplied in 78 by the gas constant R and the temperature Tbr already mentioned above and divided by a volume Vs of the intake conduit 22. The result is a modeled pressure psmod in the intake conduit 22.

Figure 5:
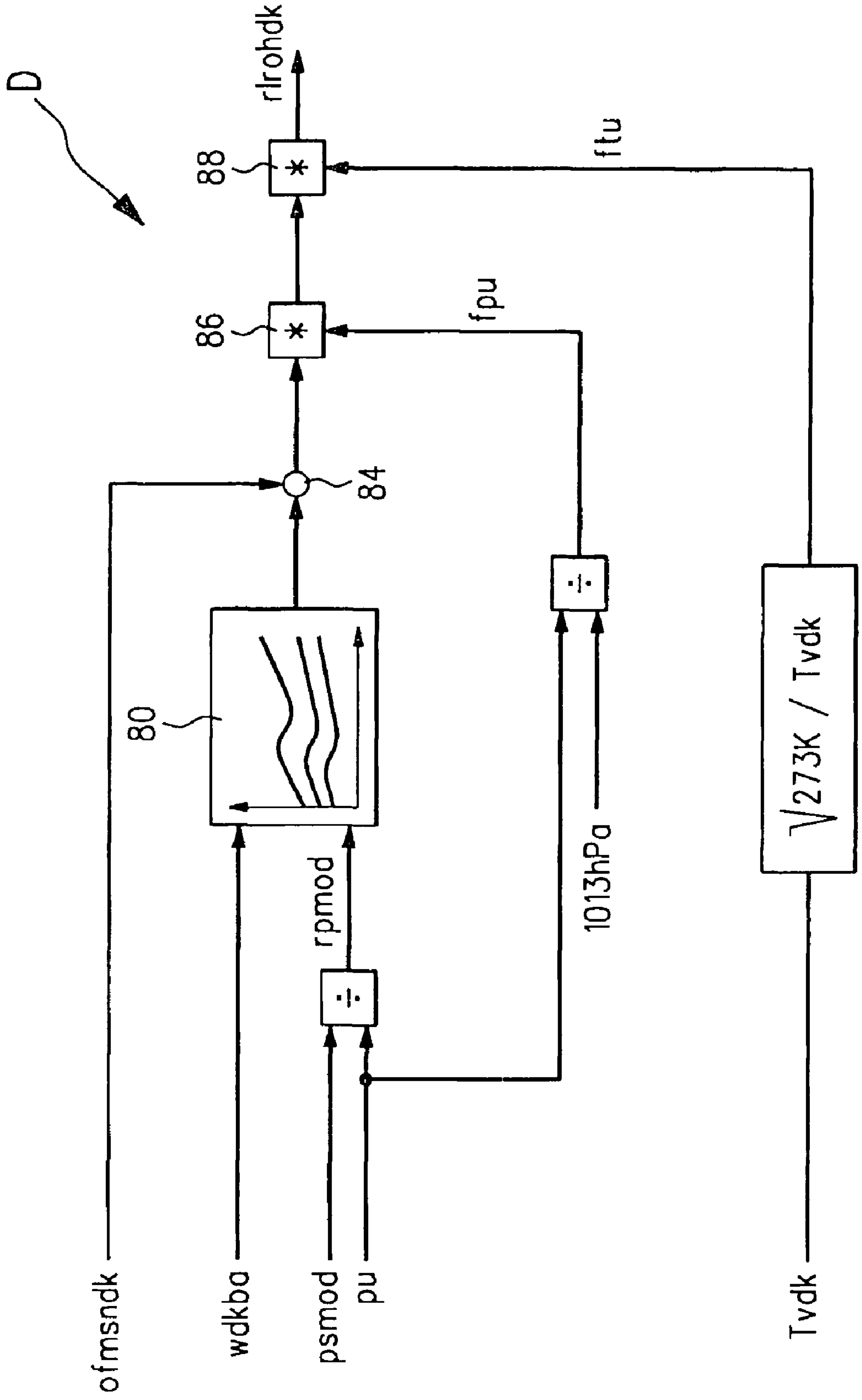
FIG. 5, a flow chart of a method for ascertaining an air flow rate out of the intake conduit into the combustion chamber.

It will now be explained how the value rldkroh, required for addressing the difference former 72, is obtained (see FIG. 5, method D). A performance graph 80 is addressed on the one hand with an angle wdkba, which is detected by the throttle valve sensor 28. On the other, this performance graph 80 is addressed with a factor rpmod, which is obtained in a divisor 82 which is addressed in turn with the modeled pressure psmod in the intake conduit 22 and with the ambient pressure pu. The throttle valve position wdkba is a measure of the opening cross section, and the pressure ratio rpmod is a measure of the flow velocity.

The output of the performance graph 80 is linked in 84 with the offset ofmsndk for the position of the throttle valve 24, and this offset has been determined in accordance with the method B already explained in conjunction with FIG. 3. The output variable obtained as a result, however, applies only for the rated density of the air. The inflow rlrohdk at the actual air density is obtained by multiplication in 86 and 88 by the factor fpu already known from FIG. 2 and by a factor ftu. The latter factor is obtained from the root of the quotient of the rated temperature of 273K and a temperature Tvdk. The latter temperature in turn is the temperature upstream of the throttle valve 24, which for the sake of simplicity can be considered equivalent to the temperature detected by the temperature sensor 32.

Figure 6:
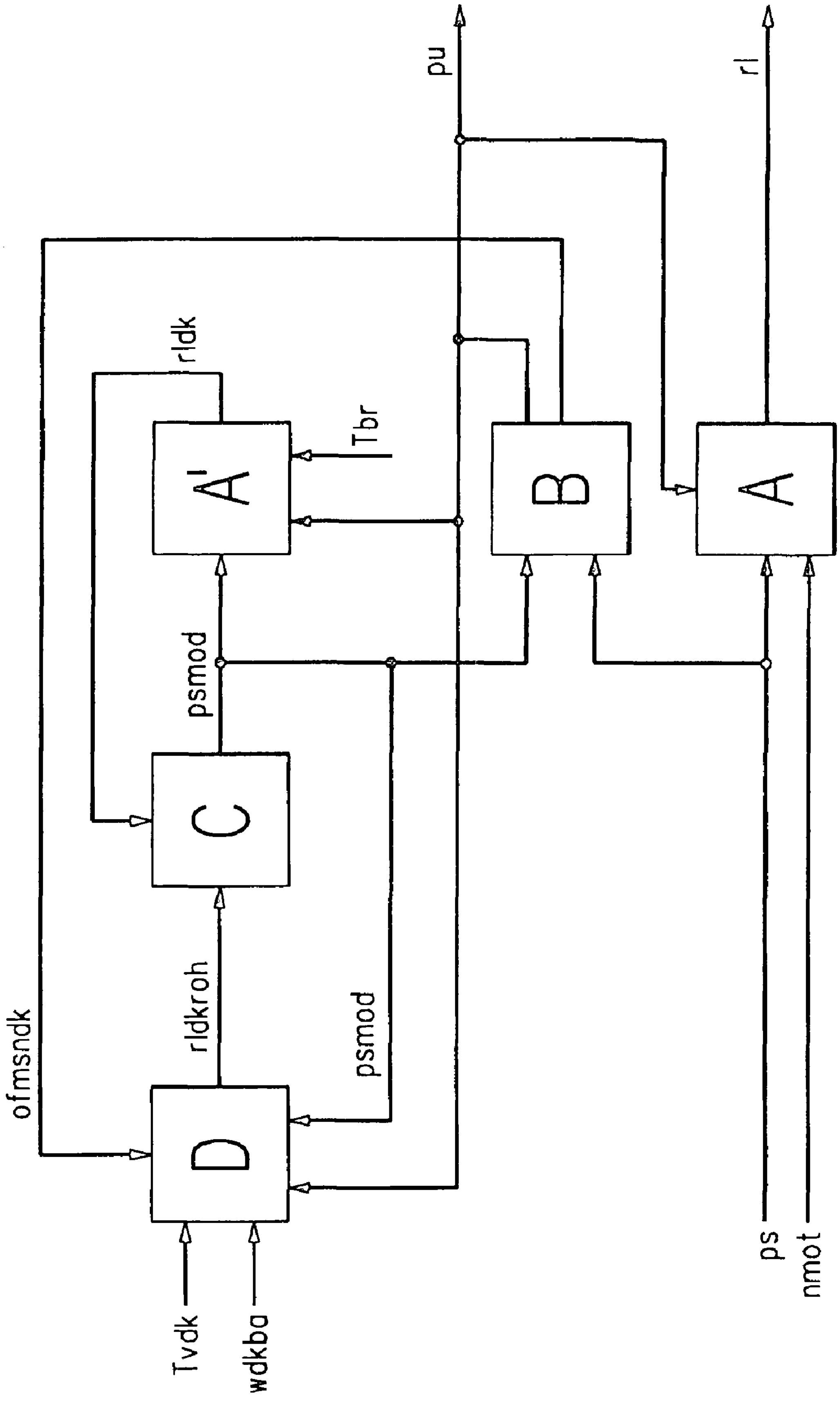
FIG. 6, a flow chart which illustrates the collaboration of the methods shown in FIGS. 2-5.

The linking of the individual methods A-D explained in conjunction with FIGS. 2-5 can also be seen overall in FIG. 6. It can be seen that the air filling rl present in the combustion chamber 14 is obtained in the final analysis only with the input variables nmot (rpm sensor 46), ps (pressure sensor 30), wdkba (throttle valve sensor 28) and Tvdk (temperature sensor 32). Above all by taking into account the ratio between the pressure ps prevailing in the intake conduit 22 and the ambient pressure pu in method block A, a reliable ascertainment of the air filling rl is made possible even in systems with major camshaft or valve overlap.

The physical basis for this is that in the event of a valve overlap, exhaust gas from the exhaust tube 40 flows through the combustion chamber 14 back into the intake conduit 22. This return flow velocity is dependent on the ratio between the pressure in the intake conduit 22 and the pressure in the exhaust tube 40 and on the valve overlap time. This is taken into account by means of the performance graph 50 in method block A. This is based on the assumption that the pressure in the exhaust tube 40 can be approximated by means of the ambient pressure. The valve overlap time in turn is dependent on the rpm nmot and on the pressure ps.

The invention claimed is:

1. A computer program, characterized in that it is programmed for use in a method for operating an internal combustion engine (10), in which an air filling (rl) in a combustion chamber (14) is ascertained, taking a pressure (ps) in an intake conduit (22) into account, characterized in that the air filling (rl) is ascertained on the basis of a model (A), which as its input variables receives an rpm (nmot) of a crankshaft (44) and a ratio of the pressure (ps) in the intake conduit (22) to an ambient pressure (pu), wherein the model (A), as its input variable, additionally receives a temperature (Tbr) of the air present in the combustion chamber (14), and wherein the temperature of the air present in the combustion chamber is ascertained on the basis of a model, which as its input variables receives a detected temperature of the air in the intake conduit and at least one further detected temperature of the engine, wherein said at least one further detected temperature is selected from the group consisting of a coolant temperature, an exhaust-gas temperature, a cylinder head temperature, or any combination of the coolant temperature, exhaust-gas temperature and cylinder head temperature.

2. An electrical memory for a control and/or regulating device (48) of an internal combustion engine (10), characterized in that a computer program for use in a method for operating an internal combustion engine is stored in it, wherein in said method for operating the internal combustion engine, an air filling (rl) in a combustion chamber (14) is ascertained, taking a pressure (ps) in an intake conduit (22) into account, characterized in that the air filling (rl) is ascertained on the basis of a model (A), which as its input variables receives an rpm (nmot) of a crankshaft (44) and a ratio of the pressure (ps) in the intake conduit (22) to an ambient pressure (pu), wherein the model (A), as its input variable, additionally receives a temperature (Tbr) of the air present the combustion chamber (14), and wherein the temperature of the air present in the combustion chamber is ascertained on the basis of a model, which as its input variables receives a detected temperature of the air in the intake conduit and at least one further detected temperature of the engine, wherein said at least one further detected temperature is selected from the group consisting of a coolant temperature, an exhaust-gas temperature, a cylinder head temperature, or any combination of the coolant temperature, exhaust-gas temperature and cylinder head temperature.

3. A control and/or regulating device (48) for an internal combustion engine (10), characterized in that it is programmed for use in a method for operating an internal combustion engine (10), in which an air filling (rl) in a combustion chamber (14) is ascertained, taking a pressure (ps) in an intake conduit (22) into account, characterized in that the air filling (rl) is ascertained on the basis of a model (A), which as its input variables receives an rpm (nmot) of a crankshaft (44) and a ratio of the pressure (ps) in the intake conduit (22) to an ambient pressure (pu), wherein the model (A), as its input variable, additionally receives a temperature (Tbr) of the air present in the combustion chamber (14), and wherein the temperature of the air present in the combustion chamber is ascertained on the basis of a model, which as its input variables receives a detected temperature of the air in the intake conduit and at least one further detected temperature of the engine, wherein said at least one further detected temperature is selected from the group consisting of a coolant temperature, an exhaust-gas temperature, a cylinder head temperature, or any combination of the coolant temperature, exhaust-gas temperature and cylinder head temperature.

4. A method for operating an internal combustion engine (10), in which an air filling (rl) in a combustion chamber (14) is ascertained, taking a pressure (ps) in an intake conduit (22) into account, characterized in that the air filling (rl) is ascertained on the basis of a model (A), which as its input variables receives an rpm (nmot) of a crankshaft (44) and a ratio of the pressure (ps) in the intake conduit (22) to an ambient pressure (pu), wherein the model (A), as its input variable, additionally receives a temperature (Tbr) of the air present in the combustion chamber (14), and wherein the temperature of the air present in the combustion chamber is ascertained on the basis of a model, which as its input variables receives a detected temperature of the air in the intake conduit and at least one further detected temperature of the engine, wherein said at least one further detected temperature is selected from the group consisting of a coolant temperature, an exhaust-gas temperature, a cylinder head temperature, or any combination of the coolant temperature, exhaust-gas temperature and cylinder head temperature.

5. The method as defined by claim 1, wherein at least one model (A, D) includes a characteristic curve and/or a performance graph (50, 80).

6. The method as defined by claim 1, wherein the ambient pressure (pu) is ascertained on the basis of a model (B), which as its input variables receives a difference (dp) between a detected pressure (ps) and a modeled pressure (psmod) in the intake conduit (22).

7. The method as defined by claim 6, wherein the ambient pressure (pu) is ascertained only if the throttle valve opening, or an equivalent variable (msdk), reaches and/or exceeds a limit value (S).

8. The method as defined by claim 6, wherein the modeled pressure (psmod) in the intake conduit (22) is ascertained on the basis of a model (C), which as its input variable receives a difference (drl) between an air flow rate (rldk), into the intake conduit (22), and an air flow rate (rlkdroh) out of the intake conduit (22) into the combustion chamber (14).

9. The method as defined by claim 8, wherein the air flow rate (rlkdroh) out of the intake conduit (22) into the combustion chamber (14) is ascertained on the basis of a model (D), which as its input variable receives a position (wdkba) of a throttle valve (24).

10. The method as defined by claim 9, wherein the model (D) additionally receives a correction variable (ofmsndk) of a throttle valve characteristic curve, which is ascertained from the difference (dp) between the modeled pressure (psmod) and the ascertained pressure (ps) in the intake conduit (22).

11. The method as defined by claim 10, wherein the correction variable (ofmsndk) is ascertained only if the throttle valve opening, or an equivalent variable (msdk), is less than a limit value (S) and/or reaches that limit value.

* * * * *